(12) United States Patent
Miyazaki

(10) Patent No.: US 8,733,412 B2
(45) Date of Patent: May 27, 2014

(54) PNEUMATIC TIRE WITH SIPE HAVING CONCAVE GROOVES

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 710 days.

(21) Appl. No.: 12/709,588

(22) Filed: Feb. 22, 2010

(65) Prior Publication Data

US 2010/0243119 A1 Sep. 30, 2010

(30) Foreign Application Priority Data

Mar. 26, 2009 (JP) ................................. 2009-076581

(51) Int. Cl.
B60C 11/12 (2006.01)

(52) U.S. Cl.
USPC ............................... 152/209.21; 152/DIG. 3

(58) Field of Classification Search
USPC ............................ 152/209.21, 209.23, DIG. 3
See application file for complete search history.

(56) References Cited

U.S. PATENT DOCUMENTS

| | | | | |
|---|---|---|---|---|
| 6,116,310 | A * | 9/2000 | Shinohara | 152/209.21 |
| 6,681,824 | B2 * | 1/2004 | Lopez | 152/DIG. 3 |
| 2002/0139164 | A1 * | 10/2002 | Ishihara | 152/DIG. 3 |
| 2003/0029537 | A1 | 2/2003 | Iwamura | |
| 2004/0134579 | A1 | 7/2004 | Tanaka | |
| 2005/0109438 | A1 * | 5/2005 | Collette et al. | 152/209.18 |
| 2006/0016533 | A1 * | 1/2006 | Ohashi | 152/151 |
| 2008/0295937 | A1 * | 12/2008 | Ohashi | 152/209.21 |
| 2009/0078350 | A1 * | 3/2009 | Ohashi | 152/209.18 |
| 2009/0223613 | A1 * | 9/2009 | Saeki | 152/209.18 |

FOREIGN PATENT DOCUMENTS

| | | | | |
|---|---|---|---|---|
| EP | 564435 | A1 * | 10/1993 | |
| EP | 1829672 | A1 * | 9/2007 | |
| JP | 10-024709 | A * | 1/1998 | |
| JP | 2000-094908 | A * | 4/2000 | |
| JP | 2000-177330 | | 6/2000 | |
| JP | 2002-321509 | A * | 11/2002 | |
| JP | 2003-025812 | | 1/2003 | |
| JP | 2004-203128 | | 7/2004 | |
| JP | 2005-161967 | | 6/2005 | |
| JP | 2006-044570 | | 2/2006 | |
| JP | 2007-008303 | | 1/2007 | |
| JP | 2008-132809 | | 6/2008 | |
| JP | 2008-132810 | A * | 6/2008 | |
| JP | 4149048 | | 7/2008 | |
| JP | 2008-290573 | | 12/2008 | |
| JP | 2009-292382 | A * | 12/2009 | |
| WO | 2008/065947 | | 6/2008 | |

OTHER PUBLICATIONS

Machine translation for Japan 2000-094908 (no date).*
Machine translation for Japan 2002-321509 (no date).*

(Continued)

*Primary Examiner* — Steven D Maki
(74) *Attorney, Agent, or Firm* — Fish & Richardson P.C.

(57) ABSTRACT

A pneumatic tire has a sipe is formed in a land portion of a tread surface. The sipe has a wide region in which a sipe width is made larger than a tread at position which is at a distance from the tread. The wide region is constructed by alternately providing a concave groove extending in a depth direction of the sipe in both sides of a sipe wall surface along a longitudinal direction of the sipe.

3 Claims, 5 Drawing Sheets

(56) References Cited

OTHER PUBLICATIONS

Machine translation for Europe 1,829,672 (no date).*
Machine translation for Europe 564,435 (no date).*
Office Action for JP 2009-076581 dated Sep. 28, 2012.
Chinese Office Action mailed in corresponding Chinese Patent Application No. 201010106290.X on Jan. 16, 2014, with English-language translation.

* cited by examiner

PNEUMATIC TIRE WITH SIPE HAVING CONCAVE GROOVES

BACKGROUND OF THE INVENTION

1. Field of the Invention

The present invention relates to a pneumatic tire in which a sipe is formed in a land portion of a tread surface, and is more particularly useful as a studless tire.

2. Description of the Related Art

Conventionally, in a studless tire, a notch called as a sipe is formed in a land portion such as a block, a rib or the like, and a traveling performance on an ice road surface having a low coefficient of friction (hereinafter, refer to as an ice performance) is enhanced based on an edge effect and a drainage effect generated by the sipe. However, since a rubber is incompressible, a motion of the tread surface being in contact with the road surface becomes larger in the case that a load is applied to the tire. Particularly, in the ice road surface, an opening portion of the sipe tends to become narrowed due to a slip of the tread surface, and there is a case that the edge effect and the drainage effect which should be achieved by the sipe are lowered.

In order to solve this problem, in a tire described in Japanese Unexamined Patent Publication No. 2007-8303, a sipe 20 having wide portions 21 to 24 as shown in FIG. 9 is formed in a block 1. The wide portions 21 to 24 are constructed by arranging a concave groove 26 extending in a longitudinal direction of the sipe 20 in sipe wall surfaces 20a and 20b, and in the case that the block 1 is exposed to a load, a deformation generated by the load is absorbed by the wide portions 21 to 24. Accordingly, it is possible to inhibit an opening portion of the sipe 20 from becoming narrower and it is possible to secure an edge effect and a drainage effect.

However, in the sipe structure as mentioned above, since a portion in which a sipe width becomes larger continuously extends along a longitudinal direction, it is known that the block tends to collapse excessively. Such excessive collapse of the block not only weakens the edge effect, but also causes a reduction of a ground contact area of the block, thereby making an adhesive friction effect generated by a softness of the rubber hard to be achieved. In addition, in the above sipe structure, since a sipe width appearing on a tread changes all of a sudden at the wide portion in the process that a wear makes progress, there is fear that a toe and heel wear is generated.

In Japanese Patent No. 4149048, there is described a sipe in which a bottom portion is formed narrowest while making a center portion in a depth direction widest, for reducing a difference of a steering stability between a wet road surface and a dry road surface. However, since the sipe width becomes maximum and even over the whole of the center portion in the depth direction in this sipe, a land portion tends to collapse excessively on the ice road surface, and the sipe width appearing on the tread changes all of a sudden in accordance with the progress of the wear. Accordingly, there can be considered that the problem relating to the ice performance and the toe and heel wear resistance mentioned above is generated.

SUMMARY OF THE INVENTION

The present invention has been made in view of the above circumstances, and an object thereof is to provide a pneumatic tire which can secure a toe and heel wear resistance as well as inhibiting a land portion from excessively collapsing so as to enhance an ice performance.

The object can be achieved by the following present invention. That is, the present invention provides a pneumatic tire in which a sipe is formed in a land portion of a tread surface, wherein the sipe has a wide region in which a sipe width is made larger than a tread at position which is at a distance from the tread, and the wide region is constructed by alternately providing a concave groove extending in a depth direction of the sipe in both sides of a sipe wall surface along a longitudinal direction of the sipe.

In the pneumatic tire having the above structure, since the sipe is provided with the wide region as mentioned above, whereby the portion in which the sipe width becomes large is arranged intermittently along the longitudinal direction, it is possible to inhibit the land portion from excessively collapsing while securing the drainage effect generated by the sipe. As a result, the adhesive friction effect can be suitably achieved by holding the ground contact area of the land portion while making the edge effect of the sipe effective, and it is possible to enhance the ice performance.

Further, in the stage that the wear makes progress and the wide region appears on the tread, since the edge component constructed by the groove wall of the concave groove is added, whereby it is possible to further improve the ice performance. Further, in the wide region, since the concave grooves are alternately provided in both sides of the sipe wall surface along the longitudinal direction of the sipe, the sipe width appearing on the tread does not change all of a sudden in the process that the wear makes progress, and it is possible to secure well the toe and heel wear resistance.

In the above structure, it is preferable that the concave groove extends in the depth direction of the sipe while being inclined in the longitudinal direction of the sipe. In accordance with this structure, since the projecting lines interposing between the concave grooves can come into contact with each other in the depth direction, between the sipe wall surfaces opposed to each other, at a time when the land portion collapses, it is possible to firmly inhibit the land portion from excessively collapsing, and it is possible to well enhance the ice performance. Further, since the position of the concave groove appearing on the tread changes in accordance with the progress of the wear, the position to which the force is applied in the opening portion of the sipe is not biased, and it is possible to preferably inhibit the toe and heel wear from being generated.

In the above structure, it is preferable that the concave groove is formed in a V-shaped form which is bent toward the longitudinal direction of the sipe. In accordance with this structure, since the rigidity in the depth direction of the sipe is improved in comparison with the case that the concave groove is inclined only in one direction, and the motion of the land portion is not biased to one direction, it is possible to more firmly inhibit the land portion from collapsing excessively, and it is possible to further enhance the ice performance.

Further, the present invention provides a pneumatic tire in which a sipe is formed in a land portion of a tread surface, wherein the sipe has a wide region in which a sipe width is made larger than a tread at position which is at a distance from the tread, and the wide region is constructed by providing a concave groove comparting a plurality of first projecting lines arranged so as to be spaced in a longitudinal direction of the sipe, and a plurality of second projecting lines arranged between the first projecting lines while partly overlapping the first projecting lines at a position in a depth direction, in both sides of a sipe wall surface, and wherein the concave grooves are shifted their phases in the longitudinal direction of the sipe, in such a manner that the first projecting line of one sipe wall is partly opposed to the second projecting line of the other sipe wall surface, between the sipe wall surfaces opposed to each other.

In the pneumatic tire having the above structure, since the sipe is provided with the wide region as mentioned above, whereby the portion in which the sipe width becomes large is arranged intermittently along the longitudinal direction, it is possible to inhibit the land portion from excessively collapsing while securing the drainage effect generated by the sipe. As a result, the adhesive friction effect can be suitably achieved by holding the ground contact area of the land portion while making the edge effect of the sipe effective, and it is possible to enhance the ice performance.

Further, in the stage that the wear makes progress and the wide region appears on the tread, since the edge component constructed by the groove wall of the concave groove is added, whereby it is possible to further improve the ice performance. Further, in this wide region, since the first projecting line and the second projecting line are opposed partly between the sipe wall surfaces opposed to each other, it is possible to increase the edge component generated by the concave groove while keeping the hardness of collapsing of the land portion, and it is possible to effectively improve the ice performance. In addition, the sipe width appearing on the tread does not change all of a sudden in the process that the wear makes progress, and it is possible to secure well the toe and heel wear resistance.

In the pneumatic tire according to the present invention, it is preferable that the wide region is provided so as to keep a distance from both ends in the longitudinal direction of the sipe. In accordance with this structure, since it is possible to more securely inhibit the land portion from excessively collapsing, by securing the rigidity in both end portions in the longitudinal direction of the sipe, it is possible to improve the edge effect of the sipe and the adhesive friction effect of the land portion surface, and it is possible to achieve an excellent ice performance.

In the pneumatic tire according to the present invention, it is preferable that a thickness of the concave groove is increased gradually toward a bottom portion of the sipe. In accordance with this structure, it is possible to hold the drainage effect of the sipe after a medium term of the wear, while inhibiting the rigidity of the land portion from being lowered.

DETAILED DESCRIPTION OF THE PREFERRED EMBODIMENTS

Figure 1:
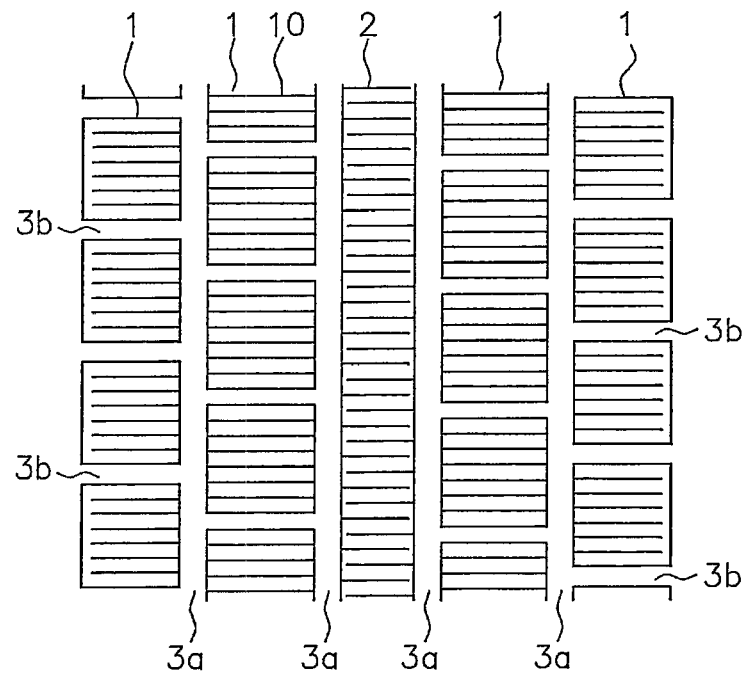
FIG. 1 is an expansion plan view showing an example of a tread surface of the pneumatic tire of the invention.

An embodiment of the present invention will be explained with reference to the drawings. FIG. 1 is an expansion plan view showing an example of a tread surface of the pneumatic tire of the invention. The pneumatic tire is provided with a tread pattern having a plurality of blocks 1 (one example of a land portion). The block 1 is comparted by a main groove 3a extending in a tire circumferential direction and a transverse groove 3b extending so as to intersect the main groove 3a, and four lines of blocks 1 are arranged so as to hold a rib 2 extending in the tire circumferential direction therebetween.

Each of the blocks 1 is provided with a plurality of sipes 10 each having a linear opening portion, in parallel at a predetermined interval. In the present embodiment, there is shown an example in which the sipe 10 extends in parallel to a tire width direction, however, the present invention is not limited to this. The sipe 10 is an open sipe which is open in a side wall of the block 1, however, both ends thereof may be terminated in an inner portion of the block 1. Since it is possible to inhibit the block 1 from excessively collapsing in accordance with the present invention, the present invention is particularly useful in the case that the sipe is the open sipe and the block 1 comparatively tends to collapse.

Figure 2:
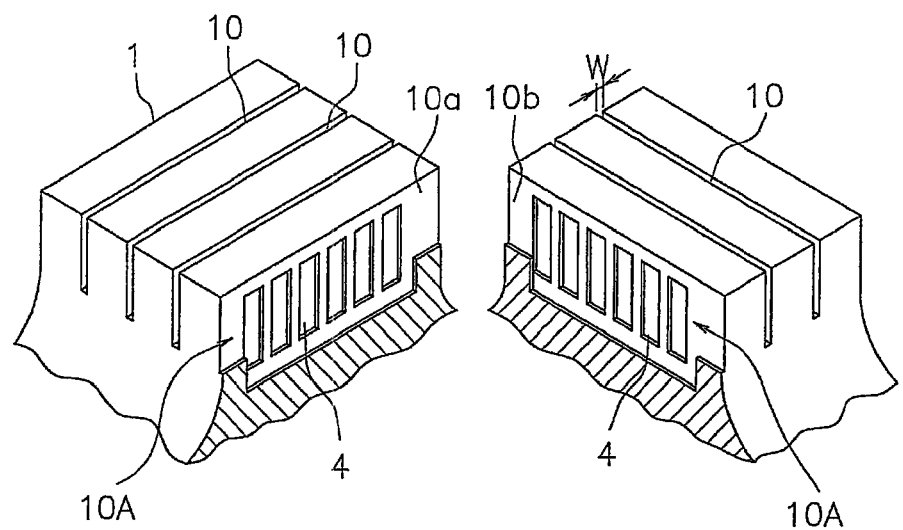
FIG. 2 is a vertical cross sectional perspective view at a time of dividing a sipe along a longitudinal direction.
Figure 3:
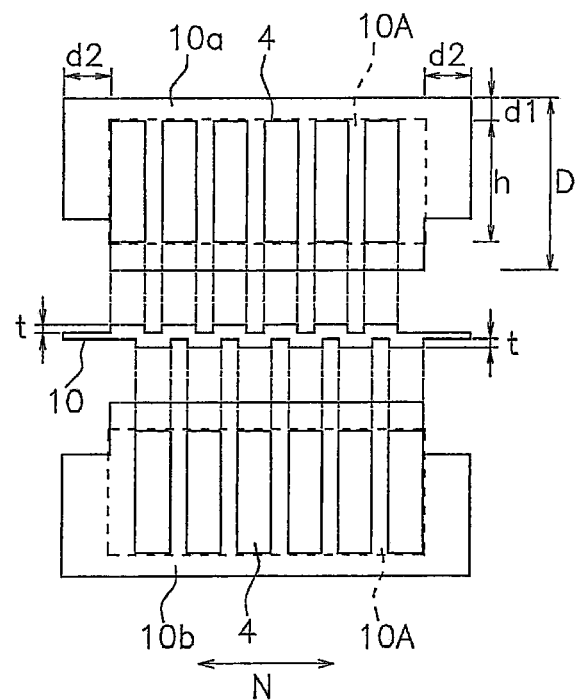
FIG. 3 is a view showing a sipe wall surface and a horizontal cross section of the sipe in FIG. 2.

FIG. 2 is a vertical cross sectional perspective view at a time of dividing the sipe 10 along a longitudinal direction. FIG. 3 is a view showing the sipe wall surface and the horizontal cross section of the sipe 10. The sipe 10 has a wide region 10A in which a sipe width is made larger than a wheel tread, at a position which is spaced at a distance d1 from the tread. The wide region 10A is constructed by alternately providing concave grooves 4 extending in a depth direction of the sipe 10 in both sides of sipe wall surfaces 10a and 10b along a longitudinal direction N of the sipe 10. A sipe width in the wide region 10A is obtained by adding a thickness t of the concave groove 4 to the sipe width W in the wheel tread.

The wide region 10A is formed in a rectangular shape enclosed by a broken line in FIG. 3, and is provided so as to be spaced at a distance d2 from both ends in the longitudinal direction N of the sipe 10. In each of the sipe wall surfaces 10a and 10b, a plurality of concave grooves 4 are provided so as to be spaced in the longitudinal direction N, and the portion in which the sipe width is large is arranged intermittently along the longitudinal direction N. Accordingly, it is possible to inhibit the block 1 from excessively collapsing while securing the drainage effect generated by the sipe 10, and it is possible to secure the edge effect and the adhesive friction effect so as to enhance the ice performance.

Further, in the stage that the wear makes progress and the wide region 23 appears on the tread, since the edge component constructed by the groove wall of the concave groove 4 is added, whereby it is possible to further improve the ice performance. Further, in the wide region 10A, since the concave grooves 4 are alternately provided in both sides of the sipe wall surface 10a and 10b along the longitudinal direction N, the sipe width appearing on the tread does not change all of a sudden in the process that the wear makes progress, and it is possible to secure well the toe and heel wear resistance.

In an initial stage of the wear, since the wide region 10A does not appear on the tread, the wide region 10A is hard to be closed even at a time when the opening portion of the sipe 10 becomes narrower. The distance d1 is set, for example, to 1 to 3.5 mm from the tread, and the sipe depth D is set to 30 to 80% of the depth of the main groove 3a so as to achieve a sufficient edge effect generated by the sipe 10. It is preferable that a height h of the wide region 10A occupies 50 to 95% of the sipe depth D, for securing an improving effect of the ice performance mentioned above.

It is preferable that the wide region 10A extends beyond 50% of the sipe depth D from the tread, and further beyond 60%. The wide region 10A may be structured such as to reach a bottom portion of the sipe 10, however, since the concave groove 4 is not set in the sipe bottom portion in the case that it does not reach the bottom portion of the sipe 10 such as the present embodiment, the portion in which a stress tends to be concentrated is not formed in the sipe bottom portion, and it is possible to inhibit a crack from being generated.

In this sipe 10, since the wide region 10A is away from both ends in the longitudinal direction N of the sipe 10, it is possible to secure the rigidity in both the end portions of the sipe 10 so as to more securely inhibit the block 1 from excessively collapsing. Accordingly, it is possible to achieve an excellent ice performance by improving the edge effect of the sipe 10 and the adhesive friction effect of the block surface. The distance d2 is set, for example, to 1.5 to 6 mm from the block edge.

In the present embodiment, the concave groove 4 of the sipe wall surface 10a and the concave groove 4 of the sipe wall surface 10b are concaved inversely to each other while overlapping partly the positions in the longitudinal direction N. Accordingly, since a continuity of the concave groove 4 along the longitudinal direction N is secured, and a portion in which the sipe width becomes larger is continuously formed in the whole of the wide region 10A, it is possible to effectively enhance the drainage effect generated by the sipe 10. In the present invention, the concave grooves 4 provided in the sipe wall surfaces 10a and 10b may not be overlapped in the longitudinal direction N.

It is preferable that the thickness t of the concave groove 4 is between 75 and 150% of the sipe width W. When this is equal to or more than 75%, it is possible to secure the edge component constructed by the groove wall of the concave groove 4 so as to well improve the ice performance, while enhancing the drainage effect generated by the sipe 10. Further, when this is equal to or less than 150%, it is possible to prevent the rigidity of the block 1 from being excessively lowered. It is preferable that the sipe width W is between 0.2 and 0.6 mm for generating a sufficient edge effect by the sipe 10.

Figure 4:
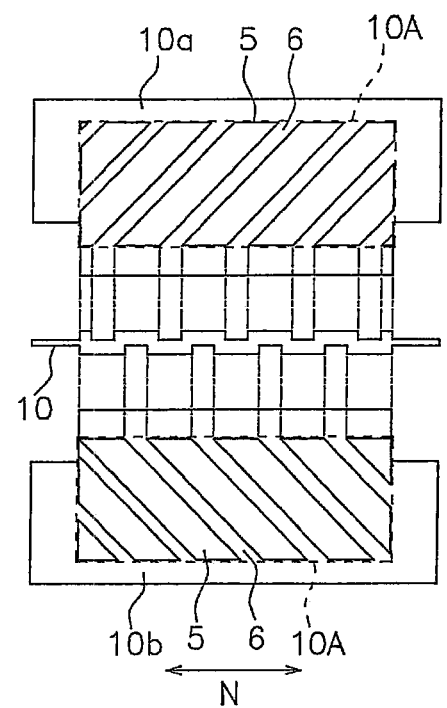
FIG. 4 is a view showing a sipe wall surface and a horizontal cross section in a modified example of the sipe.

In a modified example of the sipe 10 shown in FIG. 4, a concave groove 5 extends in a depth direction of the sipe 10 while being inclined in the longitudinal direction N. In accordance with this structure, since the projecting lines 6 interposing between the concave grooves 5 can come into contact with each other in the depth direction, between the sipe wall surfaces 10a and 10b opposed to each other, at a time when the block 1 collapses, it is possible to firmly inhibit the block 1 from excessively collapsing, and it is possible to well enhance the ice performance. Further, since the position of the concave groove 5 appearing on the tread changes in accordance with the progress of the wear, the position to which the force is applied in the opening portion of the sipe 10 is not biased, and it is possible to preferably inhibit the toe and heel wear from being generated.

Figure 5:
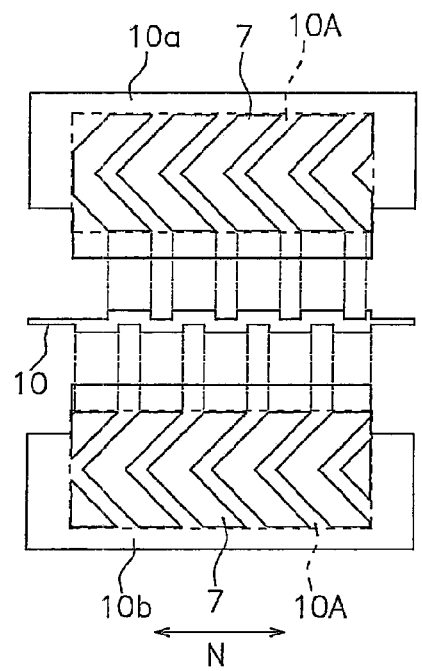
FIG. 5 is a view showing a sipe wall surface and a horizontal cross section in a modified example of the sipe.

In a modified example of the sipe 10 shown in FIG. 5, a concave groove 7 is formed in a V-shaped form which is bent toward the longitudinal direction N. In accordance with this structure, since the rigidity in the depth direction of the sipe 10 is improved in comparison with the case that the concave groove is inclined only in one direction, and the motion of the block 1 is not biased to one direction, it is possible to more firmly inhibit the block 1 from collapsing excessively, and it is possible to further enhance the ice performance. Further, a concave groove 7 may be formed in a zigzag shape by continuously connecting the V-shaped forms in the depth direction.

Figure 6:
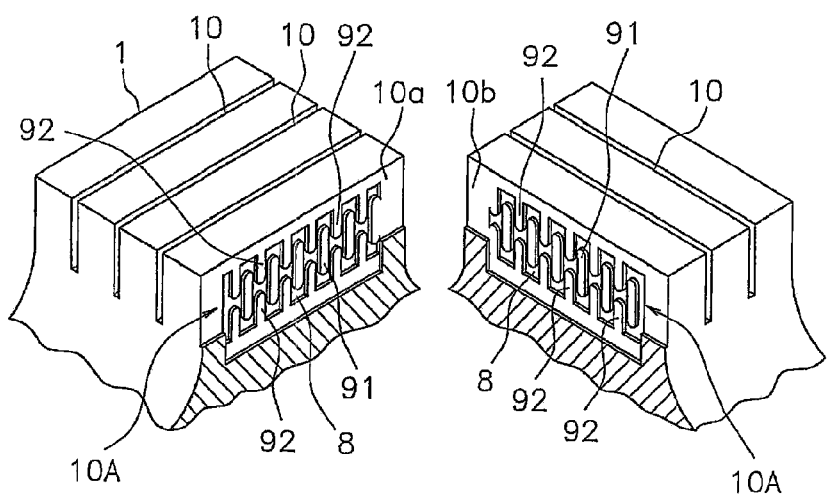
FIG. 6 is a vertical cross sectional perspective view at a time of dividing a sipe along a longitudinal direction in accordance with another embodiment of the present invention.
Figure 7:
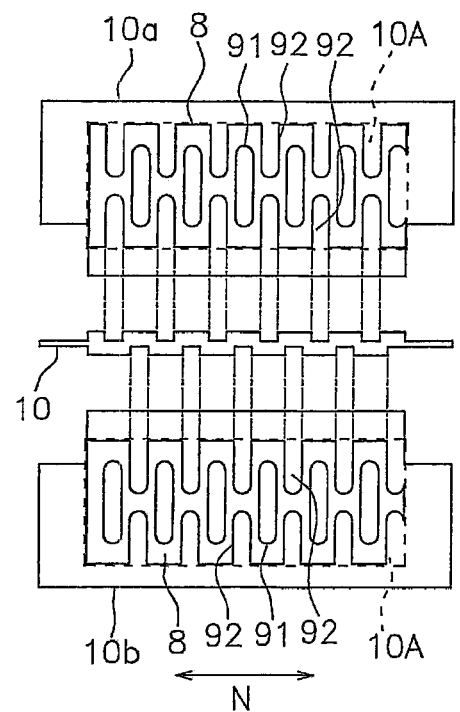
FIG. 7 is a view showing a sipe wall surface and a horizontal cross section of the sipe in FIG. 6.

FIG. 6 is a vertical cross sectional perspective view at a time of dividing the sipe 10 along a longitudinal direction in accordance with another embodiment of the present invention. FIG. 7 is a view showing the sipe wall surface and the horizontal cross section of the sipe 10. With the exception of the structure described below, since the structure and the operation are the same as those of the embodiment which is explained with reference to FIGS. 2 and 3, a description will be given mainly of different points. The common points will not be repeated.

In this sipe 10, the wide region 10A is constructed by providing concave grooves 8 in both sides of the sipe wall surfaces 10a and 10b. The concave groove 8 comparts a plurality of first projecting lines 91 which are arranged so as to be spaced at an interval in the longitudinal direction N of the sipe 10, and a plurality of second projecting lines 92 which are arranged between the first projecting lines 91, and the first projecting lines 91 and the second projecting lines 92 in the same sipe wall surface are arranged so as to be spaced in the longitudinal direction in a state in which they are overlapped partly at their positions in the depth direction. Further, the concave grooves 8 are shifted their phases in the longitudinal direction N, between the sipe wall surfaces 10a and 10b which are opposed to each other, in such a manner that the first projecting line 91 of one sipe wall surface is opposed partly to the second projecting line 92 of the other sipe wall surface.

In accordance with this sipe structure, since the first projecting line 91 and the second projecting line 92 are opposed partly between the sipe wall surfaces 10a and 10b which are opposed to each other, in the wide region 10A, it is possible to keep the collapsing difficulty of the block 1. In other words, while securing the drainage effect generated by the wide region 10A, when the block 1 collapses, the first projecting line 91 of the sipe wall surface 10a comes into contact with the second projecting line 92 of the sipe wall surface 10b in the depth direction, and the second projecting line 92 of the sipe wall surface 10a comes into contact with the first projecting line 91 of the sipe wall surface 10b in the depth direction. Accordingly, it is possible to effectively inhibit the block 1 from collapsing. In addition, since the edge component constructed by the groove wall of the concave groove 8 is increased by the arrangement of the first projecting line 91 and the second projecting line 92 as mentioned above, it is possible to effectively improve the ice performance, in the stage that the wear makes progress and the wide region 10A appears on the tread.

The tire having the sipe structure as mentioned above can be manufactured by employing such a modification that a convex shape corresponding to the concave groove is provided in a sipe blade inserted to the tread surface at a time of vulcanization forming, and keeping the other steps in the same manner as the conventional tire manufacturing steps.

The pneumatic tire in accordance with the present invention is the same as the normal pneumatic tire except the matter that the sipe as mentioned above is formed in the land portion of the block or the like, and the conventional known material, shape, structure and manufacturing method can be applied to the present invention.

The present invention can be also applied to a so-called summer tire, however, since the present invention is excellent in the ice performance, the present invention is particularly useful as a studless tire (winter tire).

Other Embodiment (1) The tread pattern of the pneumatic tire in accordance with the present invention is not particularly limited, but the block shape can employ various shapes such as a V-shaped form, a polygonal form, a curved motif form and the like, in place of the rectangular shape. Further, the sipe structure in accordance with the present invention can be applied to a sipe which is formed in a rib extending along the tire circumferential direction, and a wave-form sipe which extends in a wave form or a zigzag form along the longitudinal direction.

Figure 8:
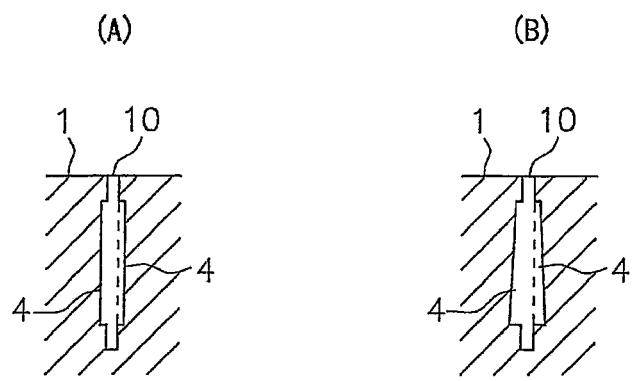
FIGS. 8(A) and 8(B) are vertical cross sectional views of the sipe.

(2) In the above embodiment, there is shown the example in which the thickness of the concave groove is fixed in the depth direction of the sipe, however, as a preferable embodiment of the present invention, there can be listed up a structure in which the thickness of the concave groove is increased gradually toward the bottom portion of the sipe. In other words, the concave groove 4 shown in FIGS. 2 and 3 may be formed in a taper shape as shown in FIG. 8(B) while forming a vertical cross section as shown in FIG. 8(A). In such case, it is possible to keep the drainage effect of the sipe 10 after a medium term of the wear, while suppressing the rigidity reduction of the block 1.

EXAMPLE

An example tire which concretely shows the structure and effect of the present invention will be explained. An evaluation of each of performances is executed as follows.
(1) Ice Turning Performance (One Example of Ice Performance)

The tire is installed to an actual car (4WD sedan of 1500 cc class), a lateral force value at a time of carrying out a turning travel (a J-turn travel) from a speed 20 km/h on an ice road surface is searched, in each of a new one and a wearing time (a state in which the wide region appears on the wheel tread). A comparative example 1 is set to 100 and a result is evaluated with indices, the more the numeric value is, the greater the lateral force value is, i.e., the more excellent the ice turning performance is.
(2) Toe and Heel Wear Resistance The tire is installed to an actual car (4WD sedan of 1500 cc class), a toe and heel wear amount (a difference of wear amount between a forward side and a rearward side of a tire rotating direction with respect to the sipe) after traveling at 12000 km on a general road is searched. The less the numeric value is, the smaller the toe and heel wear amount is, i.e., the more excellent the toe and heel wear resistance is.

Comparative Examples 1 and 2

Figure 9:
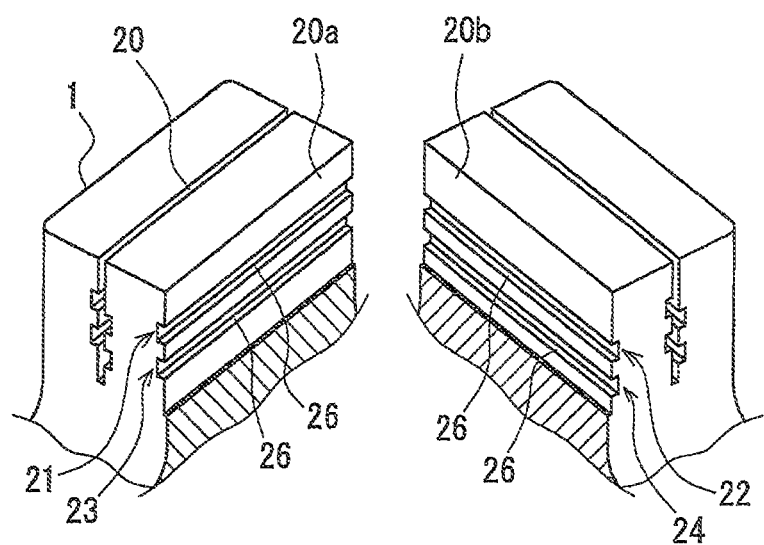
FIG. 9 is a vertical cross sectional perspective view at a time of dividing a conventional sipe along a longitudinal direction.

A comparative example 1 is set to a tire in which a normal linear sipe having no wide region is formed in the block of the tread surface shown in FIG. 1, and a comparative example 2 is set to a tire in which a sipe having a wide portion shown in FIG. 9 is formed therein. The tire size is set to 195/65R15, a depth of the main groove is set to 8.7 mm, a depth of the sipe is set to 6.3 mm, a thickness of the sipe on the wheel tread is set to 0.3 mm, and a thickness of the sipe in the wide portion is set to 0.9 mm (a thickness per one wide portion is set to 0.3 mm).

Examples 1 to 5

An example 1 is set to a tire in which the wide region shown in FIGS. 2 and 3 is provided in the sipe of the block of the tread surface shown in FIG. 1, an example 2 is set to a tire in which the wide region shown in FIG. 4 is provided therein, an example 3 is set to a tire in which the wide region shown in FIG. 5 is provided therein, and an example 4 is set to a tire in which the wide region shown in FIGS. 6 and 7 is provided therein. Further, an example 5 is set to a tire in which a thickness of the concave groove is increased gradually as shown in FIG. 8(B) in the example 1. The tire size, the main groove depth, the sipe depth and the sipe thickness are set to the same as those of the comparative example 1, and a thickness (W+2t) of the sipe in the wide region is set to 0.9 mm. Results of the evaluation are shown in Table 1.

TABLE 1

| | | Comparative example 1 | Comparative example 2 | Example 1 | Example 2 | Example 3 | Example 4 | Example 5 |
|---|---|---|---|---|---|---|---|---|
| Ice turning performance | New one | 100 | 103 | 107 | 109 | 110 | 113 | 105 |
| | Wearing time | 100 | 104 | 110 | 112 | 113 | 118 | 109 |
| Toe and heel wear resistance | | 1.3 | 1.6 | 1.4 | 1.3 | 1.3 | 1.3 | 1.4 |

As shown in Table 1, in each of the examples, the ice turning performance can be improved in comparison with the comparative examples 1 and 2. It is thought that an effect of suppressing the excessive collapse of the block contributes at a time of the new one, and the increase of the edge component caused by the concave groove contributes in addition thereto at the wearing time. Further, they are excellent in the toe and heel wear resistance in comparison with the comparative example 2, and can suppress the toe and heel wear while having the wide region. Further, in the examples 2 and 3, since it is possible to more firmly suppress the collapse of the block than the case in the example 1, both the performances are further improved. In the example 4, the ice turning performance is more preferably improved by employing the concave groove having the shape mentioned above.

What is claimed is:

1. A pneumatic tire in which a sipe is formed in a land portion of a tread surface, wherein the entire length of the sipe has a constant sipe width W at the tread surface and for a distance extending perpendicularly from the tread surface in a depth direction of the sipe, wherein the sipe has a wide region in which a sipe width larger than the sipe width at the tread surface exists at a position which is at a further distance in a sipe depth direction from the tread surface, and the wide region is constructed by alternately providing concave grooves extending in a depth direction of the sipe in both sides of a sipe wall surface along a longitudinal direction of the sipe, wherein neither sipe wall crosses an imaginary plane extending outward from a bottom of the sipe, perpendicular to the tread surface along the entire longitudinal direction of the sipe, and wherein the concave grooves are formed in a V-shaped form which is bent toward the longitudinal direction of the sipe.

2. The pneumatic tire according to claim 1, wherein the wide region is provided so as to keep a distance from both ends in the longitudinal direction of the sipe.

3. The pneumatic tire according to claim 1, wherein a thickness of the concave grooves is increased gradually toward a bottom portion of the sipe.

* * * * *